United States Patent
Tsuboi (10) Patent No.: US 8,039,751 B2
(45) Date of Patent: Oct. 18, 2011

(54) MOTOR AND COMPRESSOR WITH THE SAME

(75) Inventor: Noboru Tsuboi, Kako-gun (JP)

(73) Assignee: Kobe Steel, Ltd., Kobe-shi (JP)

( * ) Notice: Subject to any disclaimer, the term of this patent is extended or adjusted under 35 U.S.C. 154(b) by 79 days.

(21) Appl. No.: 12/722,084

(22) Filed: Mar. 11, 2010

(65) Prior Publication Data

US 2010/0290932 A1    Nov. 18, 2010

(30) Foreign Application Priority Data

May 15, 2009    (JP) .................................. 2009-118639

(51) Int. Cl.
*H01B 17/26*    (2006.01)

(52) U.S. Cl. ........................................ 174/151

(58) Field of Classification Search .................. 174/151, 174/152 R; 310/559, 71; 439/908, 877, 439/910

See application file for complete search history.

(56) References Cited

U.S. PATENT DOCUMENTS

| | | | | |
|---|---|---|---|---|
| 1,442,041 A * | 1/1923 | Boddie | ............................ | 241/35 |
| 1,896,448 A * | 2/1933 | Kercher | ............................ | 62/295 |
| 1,930,775 A * | 10/1933 | Schweisthal | ..................... | 33/346 |
| 2,163,055 A * | 6/1939 | Olson | ............................ | 313/149 |
| 2,637,826 A * | 5/1953 | Humphrey | ..................... | 310/247 |
| 3,380,141 A * | 4/1968 | Rofer | .............................. | 29/764 |
| 4,474,419 A * | 10/1984 | Konoshima | .................... | 439/678 |
| 4,781,553 A * | 11/1988 | Nomura et al. | ............... | 418/104 |
| 4,826,412 A * | 5/1989 | Kubo et al. | .................... | 418/180 |
| 4,957,417 A * | 9/1990 | Tsuboi | ....................... | 417/423.13 |
| 5,064,342 A * | 11/1991 | Iwai | ................. | 415/55.1 |
| 6,045,344 A * | 4/2000 | Tsuboi et al. | ................. | 418/100 |
| 6,302,654 B1 * | 10/2001 | Millet et al. | ..................... | 417/63 |
| 6,321,563 B1 * | 11/2001 | Ikeda et al. | ...................... | 62/505 |
| 6,488,480 B1 * | 12/2002 | Zhong | ........................... | 417/310 |
| 6,540,489 B1 * | 4/2003 | Higashiyama | .............. | 417/410.1 |

(Continued)

FOREIGN PATENT DOCUMENTS

JP          9-180770          7/1997

*Primary Examiner* — Tulsidas C Patel
*Assistant Examiner* — Vladimir Imas
(74) *Attorney, Agent, or Firm* — Oblon, Spivak, McClelland, Maier & Neustadt, L.L.P.

(57) ABSTRACT

In a motor, one ends of a plurality of electric wires with the other ends connected to the motor side are connected to a terminal rod, and the terminal rod is exposed to the exterior of a motor casing via a terminal base. The terminal rod is provided with a flange portion and a crimping portion. A concave part is formed on an end surface of the crimping portion, and a communication part providing communication between an outer surface and the concave part is formed. The terminal base is provided with a depression to be fitted to the flange portion of the terminal rod, a seal portion having a diameter reduced from the depression, and a through portion passing from the seal portion through to the exterior of the motor casing. A seal member is put on the terminal rod. In a state that the electric wires are inserted into the concave part of the crimping portion, the outer surface of the crimping portion is pressurized, so that the electric wires are fixed to the crimping portion. With such a configuration, it is possible to reduce electric resistance between the electric wires from the motor side and the terminal rod and strongly combine the electric wires and the terminal rod.

6 Claims, 9 Drawing Sheets

U.S. PATENT DOCUMENTS

| | | | |
|---|---|---|---|
| 6,564,576 B2 * | 5/2003 | Shibuya | 62/505 |
| 6,619,933 B2 * | 9/2003 | Ikeda | 417/410.1 |
| 6,664,678 B2 * | 12/2003 | Shimizu | 310/71 |
| 6,676,458 B2 | 1/2004 | Kuwayama et al. | |
| 7,018,185 B2 * | 3/2006 | Makino et al. | 418/94 |
| 7,021,973 B2 * | 4/2006 | Morikaku et al. | 439/709 |
| 7,045,724 B1 * | 5/2006 | Chou | 200/61.45 R |
| 7,083,399 B2 * | 8/2006 | Kurihara et al. | 417/423.7 |
| 7,281,910 B2 * | 10/2007 | Hasegawa | 417/410.5 |
| 7,285,882 B2 * | 10/2007 | Zhong | 310/58 |
| 7,288,866 B2 * | 10/2007 | Kuribayashi et al. | 310/71 |
| 7,573,165 B2 * | 8/2009 | Cook | 310/90 |
| 7,586,225 B2 * | 9/2009 | Raszkowski et al. | 310/71 |
| 7,759,828 B2 * | 7/2010 | Zhong | 310/58 |
| 7,775,782 B2 * | 8/2010 | Choi et al. | 418/23 |
| 7,806,712 B2 * | 10/2010 | Negishi et al. | 439/281 |
| 7,922,467 B2 * | 4/2011 | Swanson et al. | 417/423.7 |
| 7,982,348 B2 * | 7/2011 | Hasegawa | 310/71 |
| 2002/0018724 A1 * | 2/2002 | Millet et al. | 417/228 |
| 2002/0043883 A1 * | 4/2002 | Shimizu | 310/71 |
| 2004/0184931 A1 * | 9/2004 | Millet et al. | 417/298 |
| 2009/0277215 A1 * | 11/2009 | Tsuboi | 62/498 |

* cited by examiner

MOTOR AND COMPRESSOR WITH THE SAME

BACKGROUND OF THE INVENTION

1. Field of the Invention

The present invention relates to a motor suitable for a compressor, and a compressor with the motor.

2. Description of the Related Art

Conventionally, a core wire formed by twisting a plurality of aluminum wires by predetermined length from end surfaces thereof is used for a motor of a compressor. In order to connect the core wire to a terminal of the compressor, Japanese Patent Laid-Open No. 1997-180770 discloses a method of providing a fitting hole extending in the axial direction in a main body of a rod shape conducting terminal made of aluminum, forming a cutout portion communicating with the fitting hole in a part of an outer circumference thereof, inserting a core wire into the fitting hole, heating from the upper side of the cutout portion so as to melt at least an edge of the cutout portion, and fixing and connecting the core wire and the main body by the welding.

However, with this method, the aluminum wires and the terminal main body are insufficiently combined at an inner circumference on the radially opposite side of the cutout portion of the terminal main body, so that conductivity is deteriorated. Electric resistance is increased in a part where the both are in contact with each other, so that an amount of heat generation is increased. As a result, there is a possibility that burnout of the motor is caused.

U.S. Pat. No. 6,676,458 discloses a method of inserting a core wire portion of an electric wire into a wire insertion hole provided in a wire connecting portion of a connection terminal, and crimping the wire connecting portion around the full outer circumference thereof uniformly in the radial direction by a full-circumferential crimping device so as to connect the electric wire and the connection terminal. When the air remains in closed space in a deeper part of the wire insertion hole where the core wire portion of the electric wire is crimped in a semi-sealed type motor using this method, pressure of the remaining gas is increased in accordance with a temperature increase inside a motor casing. Thereby, the electric wire is moved in the direction of dropping off the wire insertion hole of the connection terminal, so as to cause a problem that contact resistance is increased.

SUMMARY OF THE INVENTION

In consideration of the problem above, it is an object of the present invention to provide a motor capable of reducing electric resistance between a plurality of electric wires from the motor side and a terminal rod to be connected to a power source, and strongly combining the electric wires and the terminal rod, and a screw compressor with this motor.

In a motor of the present invention and a screw compressor with the motor as a means for solving the problem above, the motor includes a motor casing, a terminal rod having a flange portion arranged between both ends thereof, and a crimping portion arranged in one end thereof, with a concave part formed on an end surface of the crimping portion, and a communication part providing communication between an outer surface of the crimping portion and the concave part, a terminal base having a depression provided on a surface thereof contacted with the interior of the motor casing, a seal portion adjacent to the depression, and a through portion passing from the seal portion through to the exterior of the motor casing, the terminal base fitted to the flange portion of the terminal rod at the depression, a seal member disposed along the seal portion, and a plurality of electric wires with one ends connected to a motor stator inside the motor casing, and the other ends fixed to the crimping portion by pressurizing the outer surface of the crimping portion in a state that the other ends are inserted into the concave part. The terminal base is attached to the motor casing, and the terminal rod passes through the terminal base with the other end on the opposite side of the crimping portion exposed to the exterior of the motor casing.

According to this configuration, the one ends of a plurality of the electric wires are connected to the motor stator inside the motor casing, the other ends thereof are inserted into the concave part of the crimping portion of the terminal rod, and the outer surface of the crimping portion is pressurized, so that the other ends of a plurality of the electric wires can be fixed to the crimping portion. Since a plurality of the electric wires and the concave part are in uniform contact with each other by crimping, it is possible to reduce the electric resistance between a plurality of the electric wires and the terminal rod. Since the air between the electric wires and the concave part of the terminal rod can be moved through the communication part, it is possible to release pressure of the concave part so as to prevent the electric wires inserted into the concave part from moving in the direction of dropping off the concave part. Therefore, the electric resistance between the electric wires and the terminal rod is not increased.

Preferably, the seal portion has a diameter gradually reduced in the direction from the depression toward the exterior of the motor casing, and the seal member is put on the terminal rod on the opposite side of the flange portion with respect to the crimping portion so as to be disposed along the seal portion. According to this configuration, the seal portion can be easily processed, and the seal member is easily disposed along the seal portion.

Preferably, the terminal base is made of polyphenylene sulfide. According to this configuration, it is possible to have corrosion resistance against gas in the interior of the motor casing, and pressure resistance against pressure in the interior of the motor casing.

Preferably, both of the electric wires and the terminal rod contain aluminum. According to this configuration, even when corrosive gas is compressed, corrosion is not easily caused due to corrosion resistant aluminum.

Preferably, each of the electric wires is provided with a coat made of fluorine resin. According to this configuration, it is possible to more surely prevent damage and corrosion of the electric wires.

DESCRIPTION OF THE PREFERRED EMBODIMENTS

Hereinafter, an embodiment of the present invention will be described in accordance with the drawings.

Figure 1:
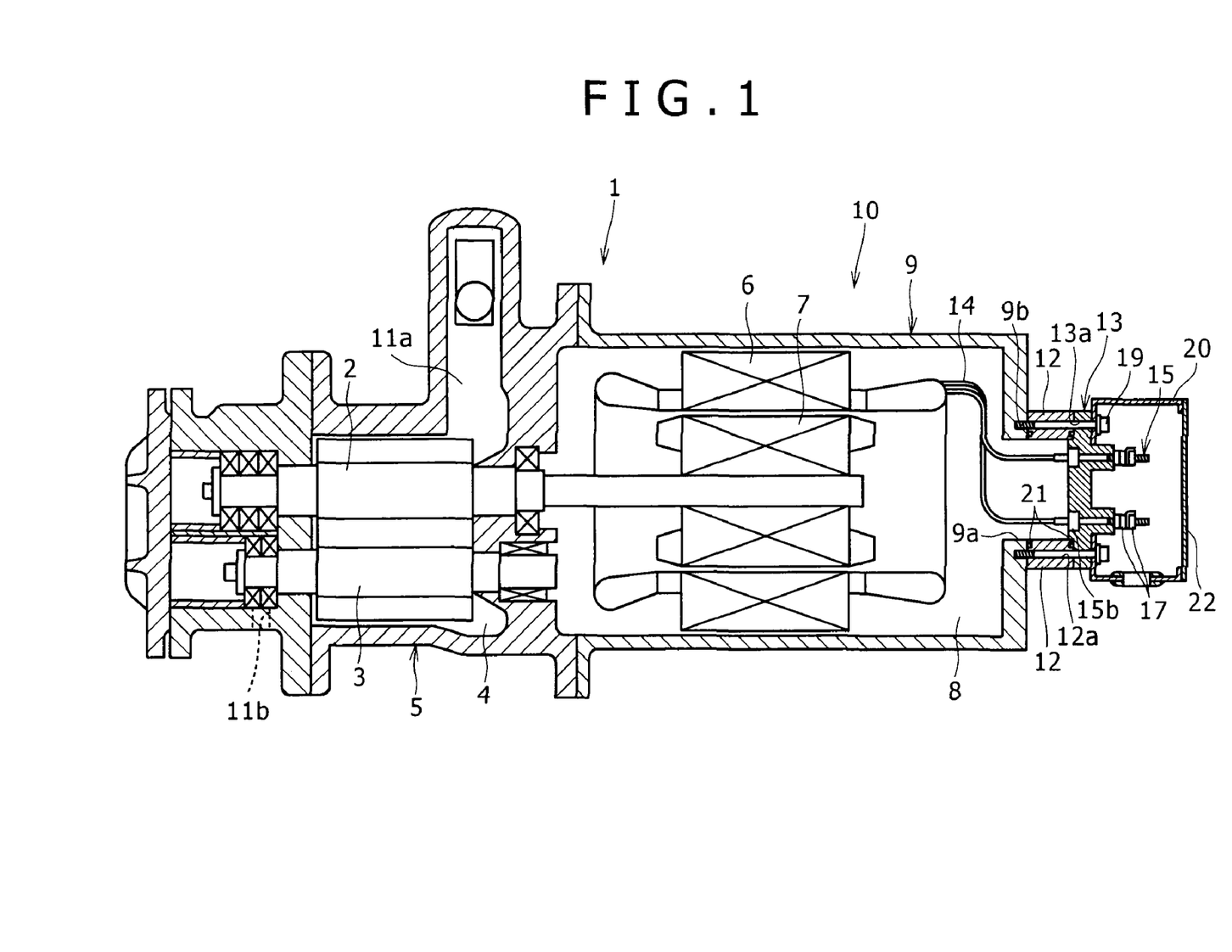
FIG. 1 is a sectional view of a screw compressor according to the present invention.

FIG. 1 shows a screw compressor 1 according to one embodiment of the present invention. In the screw compressor 1, a rotor casing 5 forming a rotor chamber 4 accommodating screw rotors (a male rotor 2 and a female rotor 3) meshed with each other is integrally connected to a motor casing 9 forming a motor chamber 8 accommodating a motor stator 6 and a motor rotor 7 sharing an axis with the male rotor 2. In FIG. 1, a motor 10 is a part on the right side on the paper relative to a connection part between the rotor casing 5 and the motor casing 9.

The screw rotors 2, 3 are rotated by rotational force of the motor rotor 7, so as to suction and compress a refrigerant (ammonia gas) from a suction flow passage 11a, and discharge the compressed refrigerant from a discharge flow passage 11b.

An opening part 9a is provided on an end surface of the motor casing 9 on the opposite side of the rotor chamber 4. Screw holes 9b for attaching a terminal base 13 via a spacer 12 are arranged in a circumferential edge of the opening part 9a of the motor casing 9.

The spacer 12 has a cylindrical shape, and bolt holes 12a into which, attachment bolts 19 (described later) are inserted are formed in a wall of the spacer 12 in the axial direction. The spacer 12 and terminal base 13 close the space continuous from the motor chamber 8. O rings 21 are arranged on an abutment surface of the spacer 12 with the motor casing 9 and an abutment surface of the spacer 12 with the terminal base 13 respectively so as to air-tightly close the opening part 9a of the motor casing 9. The screw compressor 1 has a sealed structure such that the refrigerant flows from the rotor chamber 4 into the motor chamber 8, however, since the motor chamber 8 is sealed, the refrigerant is not leaked out to the exterior thereof.

Figure 2:
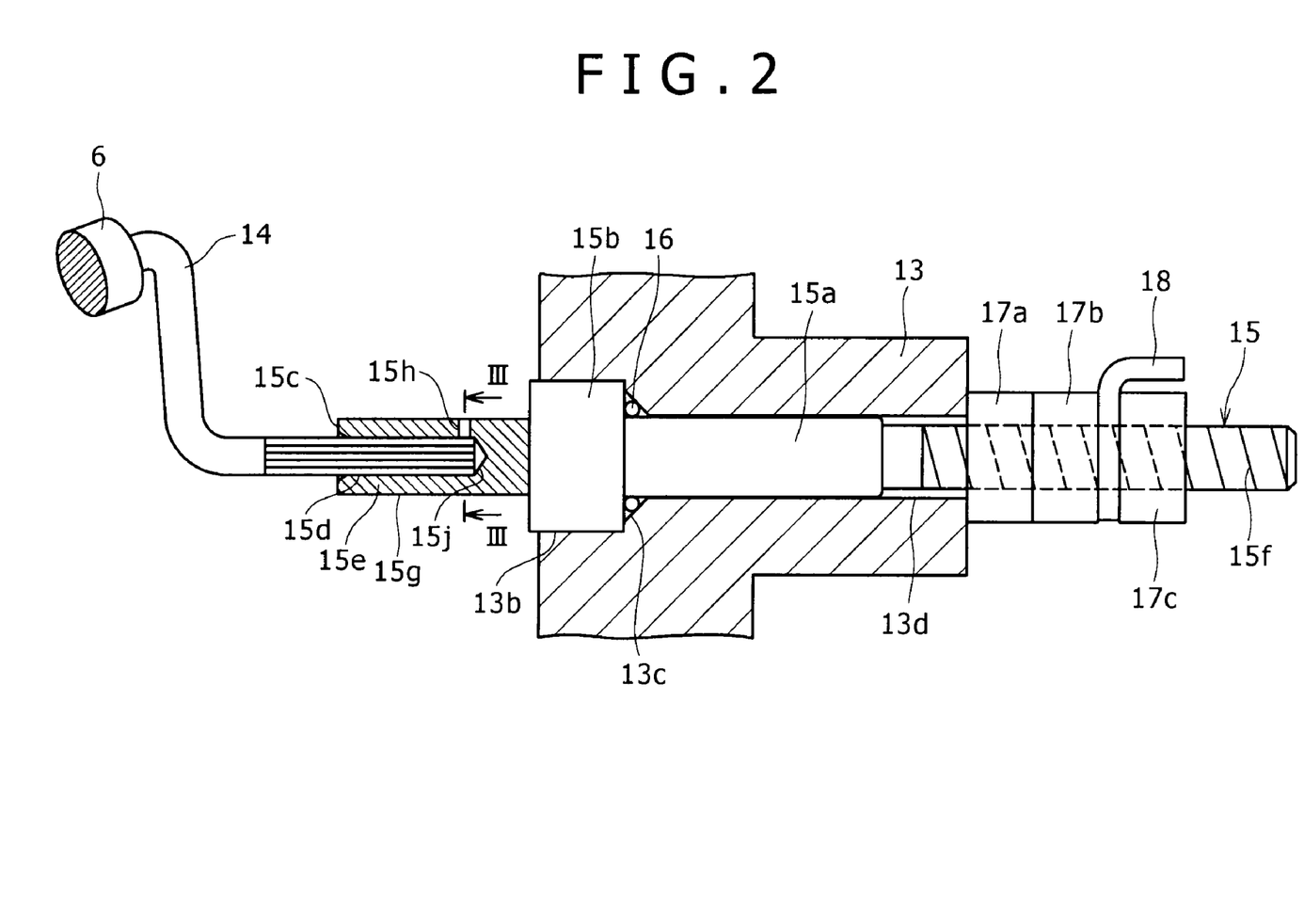
FIG. 2 is an enlarged view of a terminal base and a terminal rod for a motor in the screw compressor according to the present invention.

Insertion holes 13a are provided in the terminal base 13 at positions corresponding to the bolt holes 12a of the spacer 12. As shown in FIG. 2, the terminal base 13 is provided with depressions 13b to be fitted with flange portions 15b of terminal rods 15 on a surface contacted with the interior of the motor casing 9, seal portions 13c each having a diameter gradually reduced in the direction from the depression 13b toward the exterior of the motor casing 9, and through portions 13d each penetrating from the seal portion 13c to the exterior of the motor casing 9 and having the size capable of accommodating a shaft portion 15a of the terminal rod 15 (described later). The terminal base 13 is made of polyphenylene sulfide (PPS) resin. The PPS resin has corrosion resistance against gas (the ammonia gas) in the interior of the motor casing 9, and pressure resistance against pressure in the interior of the motor casing 9. In the present embodiment, the motor casing 9 is designed so as to be endurable even when the pressure in the interior thereof is boosted to about 2 MPa. It should be noted that the pressure in the interior of the motor casing 9 at the time of normal operation is about 0.1 to 0.4 MPa, and the pressure thereof at the time of stoppage is about 0.1 to 0.8 MPa. Thus, the pressure in any case is higher than atmospheric pressure. The terminal rods 15 each connected to a plurality of electric wires 14 from the motor side are fixed to the terminal base 13.

Each terminal rod 15 is provided with the flange portion 15b arranged between one end of the terminal rod 15 and the other end, a crimping portion 15e provided on the other end, the shaft portion 15a provided on the opposite side of the flange portion 15b with respect to the crimping portion 15e, and a thread portion 15f provided on the opposite side of the shaft portion 15a with respect to the flange portion 15b. A concave part 15d is provided on an end surface 15c of the crimping portion 15e. A conical clearance part 15j is formed in a deeper part of the concave part 15d by a tip of a drill at the time of processing the concave part 15d. A communication part 15h providing communication between a position of an outer surface 15g of the crimping portion 15e corresponding to the deeper part of the concave part 15d and the concave part 15d is provided. The terminal rod 15 contains aluminum. That is, the terminal rod 15 is made of pure aluminum or aluminum alloy. The terminal rod 15 is not easily corroded even when in contact with the ammonia gas having corrosivity with copper. In a state that the flange portion 15b is fitted to the depression 13b of the terminal base 13, a plurality of nuts 17a, 17b is screwed together with the thread portion 15f exposed to the exterior of the motor casing 9 so that the terminal rod 15 is fixed to the terminal base 13. In the present embodiment, the nuts 17a, 17b are a so-called double nut. A connection terminal 18 of a wire for supplying electric power from a power source is sandwiched and fixed between the nut 17b and a nut 17c. Since both of the electric wires and the terminal rod contain aluminum, the electric wires and the terminal rod are not easily corroded even when the gas having corrosivity with copper is compressed.

Figure 3:
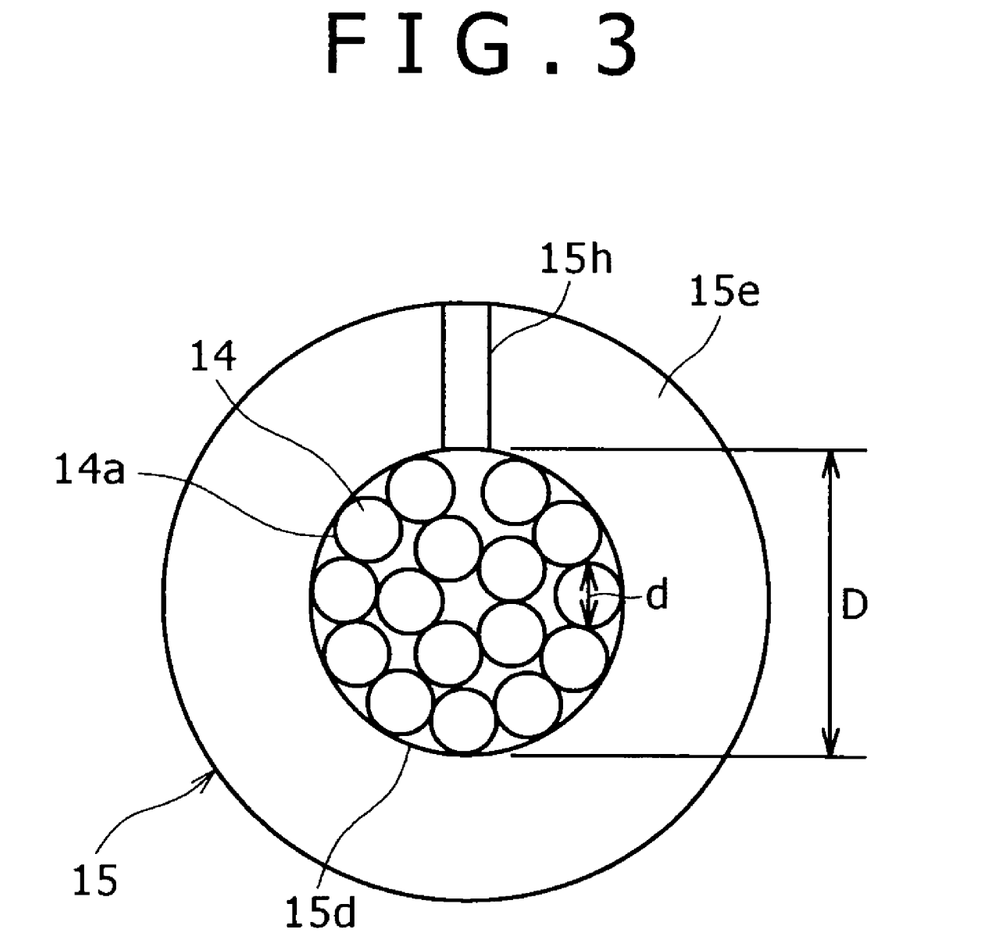
FIG. 3 is a sectional view taken along the line III-III in FIG. 2.

One ends of a plurality of the electric wires 14 are connected to the motor stator 6 inside the motor casing 9, the other ends are inserted into the concave part 15d of the terminal rod 15, and the outer surface 15g of the crimping portion 15e is crimped to fix the electric wires 14 to the crimping portion 15e. The electric wires 14 contain aluminum. In the present embodiment, a plurality of the electric wires 14 is sixteen aluminum wires inserted into the concave part 15d as shown in FIG. 3. The electric wires 14 are provided with a coat 14a made of fluorine resin capable of more surely preventing damage and corrosion.

A seal member 16 is put on and attached to the shaft portion 15a of the terminal rod 15 on the opposite side of the flange portion 15b with respect to the crimping portion 15e, so that in a state that the flange portion 15b of the terminal rod 15 is fitted to the depression 13b of the terminal base 13, the seal member 16 is positioned at the seal portion 13c of the terminal base 13 (the seal member 16 is provided along the seal portion 13c). In the present embodiment, the seal member 16 is a ring shape elastic member. The seal member 16 is elastically deformed by the seal portion 13c of the terminal base 13 surrounded by a surface formed so that the diameter is gradually reduced in the direction toward the exterior of the motor casing 9, and the shaft portion 15a and the flange portion 15b of the terminal rod 15, so as to block communication between the interior and the exterior of the motor casing 9.

As shown in FIG. 1, a part of the terminal rod 15 exposed to the exterior and including the connection terminal 18 is covered by an outer box 20 provided with a lid 22 and fastened by the attachment bolts 19 for attaching the terminal base 13 and the spacer 12 to the motor casing 9.

Figure 4:
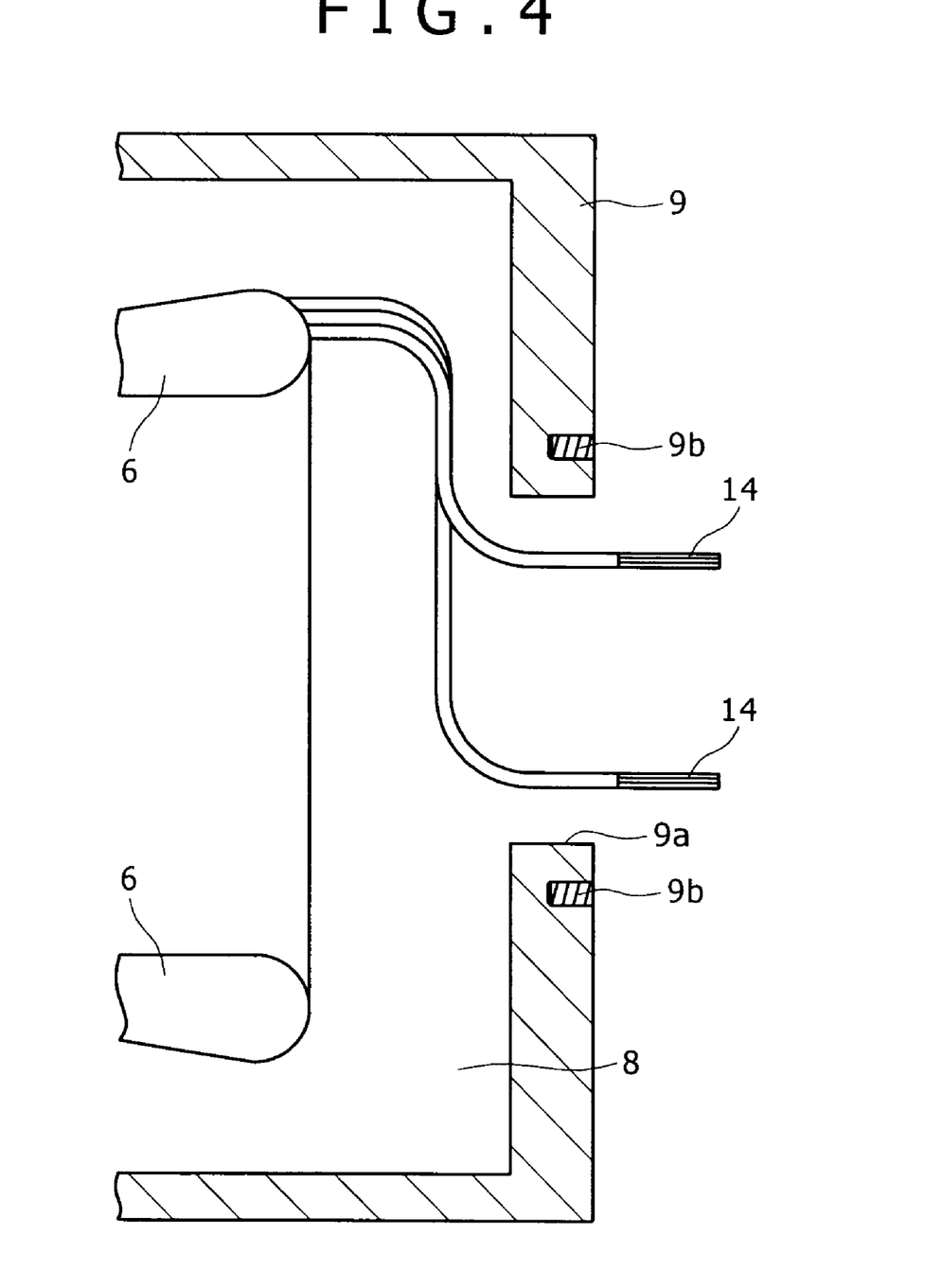
FIG. 4 is a partially sectional view showing a procedure of attachment of the terminal base in the screw compressor in FIG. 1.
Figure 5:
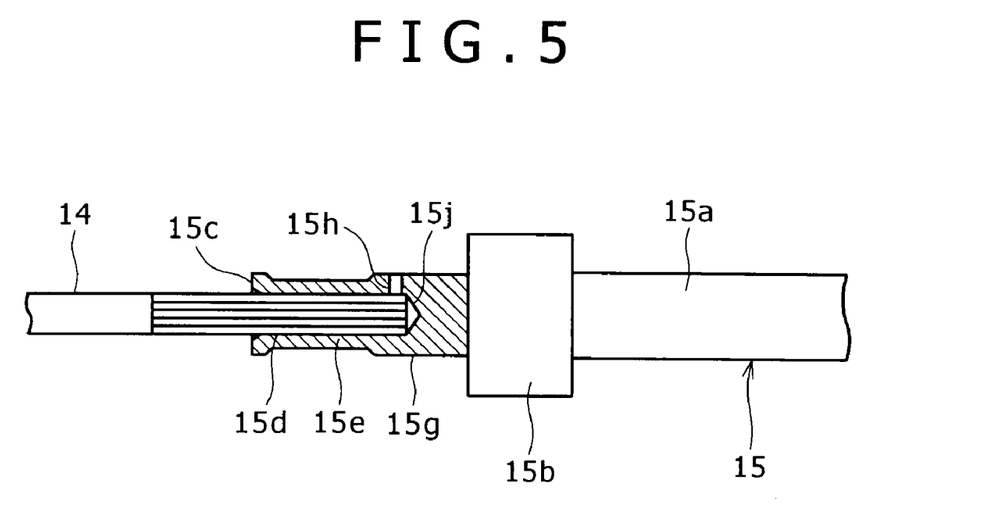
FIG. 5 is a view showing a part of the terminal rod to which a plurality of electric wires is combined at a crimping portion by crimping.

Now, FIGS. 4 to 8 show the attachment procedures of the terminal base 13 of the compressor 1. Firstly, as shown in FIG. 4, front ends of the sixteen electric wires 14 connected to the motor stator 6 are pulled out from the opening part 9a of the motor casing 9. Then, the coat 14a is stripped so that the front ends of the electric wires 14 are connected and electrically conducted to the terminal rod 15. After that, as shown in FIG. 5, in a state that the sixteen electric wires 14 are gathered and the front ends thereof are aligned, the electric wires 14 are inserted from the end surface 15c side into a deeper part of the concave part 15d of the crimping portion 15e of the terminal rod 15. In a state that a plurality of the electric wires 14 is inserted into the concave part 15d of the crimping portion 15e, the entire circumference of the outer surface 15g of the crimping portion 15e except the communication part 15h is uniformly pressurized, so that a plurality of the electric wires 14 is fixed to the crimping portion 15e. Thereby, a plurality of the electric wires 14 from the motor 10 side can be strongly combined to the terminal rod 15. Since a plurality of the electric wires 14 and the concave part 15d are in uniform contact with each other by crimping, it is possible to reduce electric resistance between a plurality of the electric wires 14 and the terminal rod 15.

Figure 6:
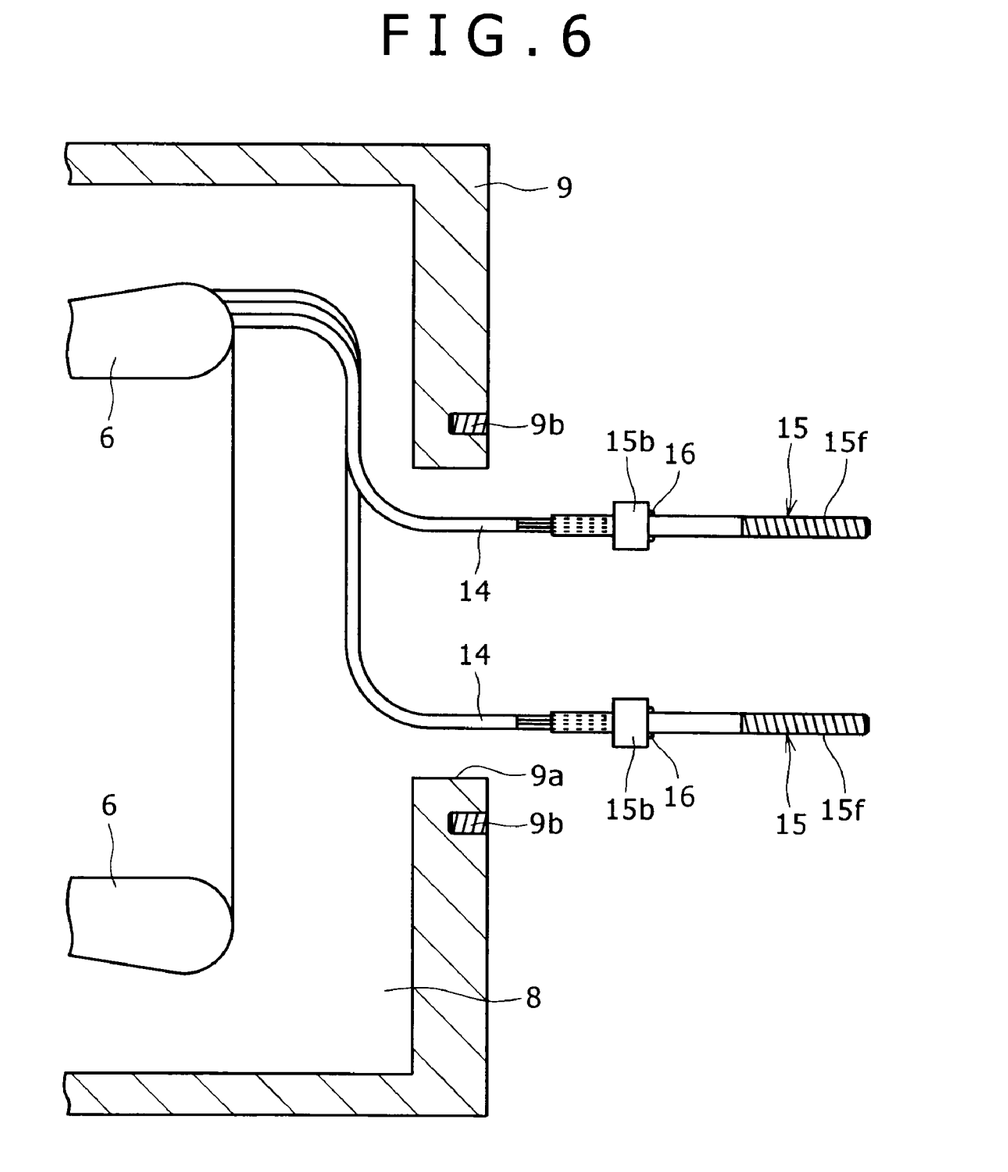
FIG. 6 is a partially sectional view showing a procedure of attachment of the terminal base in the screw compressor in FIG. 1.

As shown in FIG. 6, after the electric wires 14 are combined to the terminal rod 15, the seal member 16 is put, from the side of the thread portion 15f of the terminal rod 15, on the shaft portion 15a until the seal member 16 is abutted with the flange portion 15b. In addition, the seal member 16 may be preliminarily put on before combining the electric wires 14 to the terminal rod 15.

Figure 7:
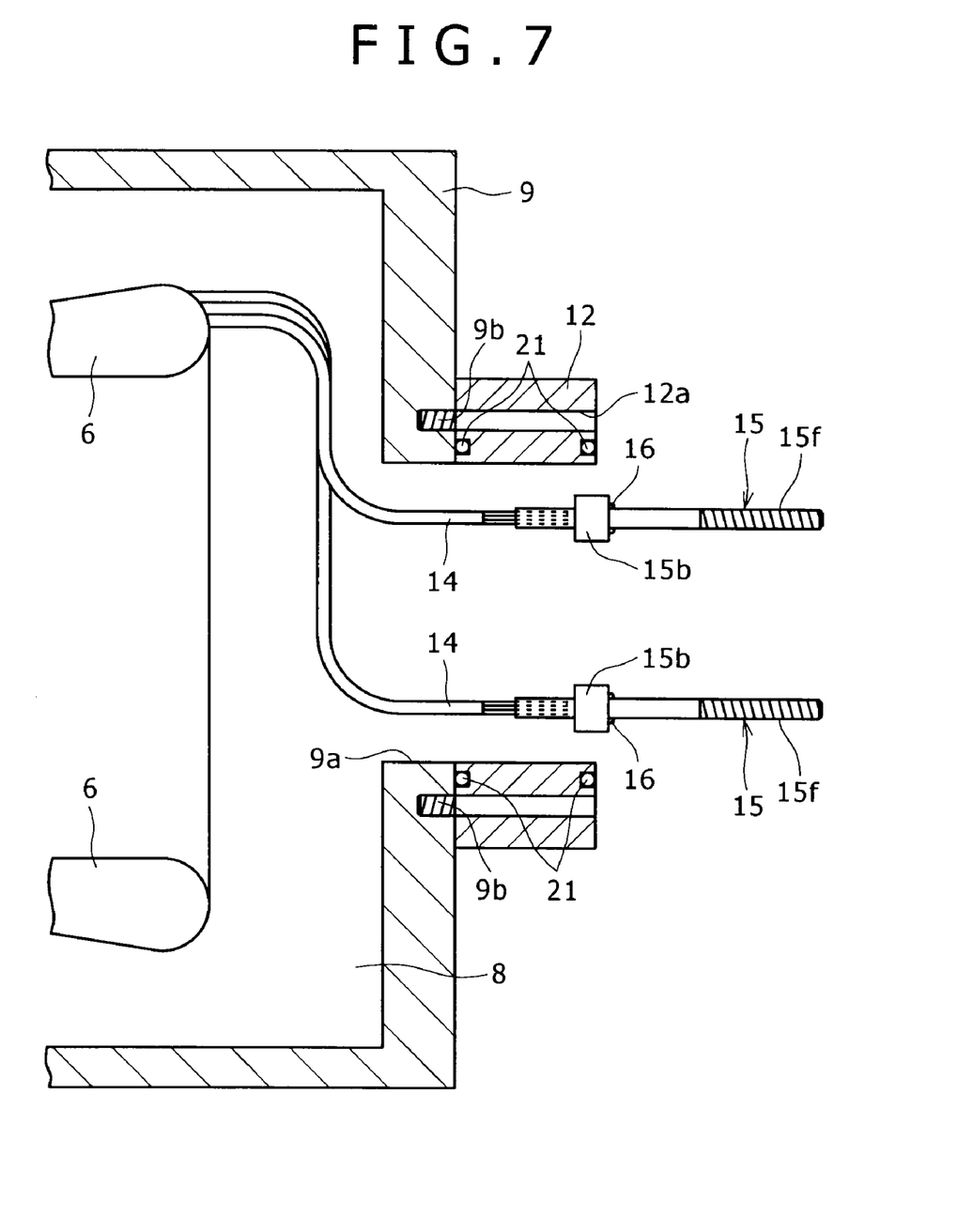
FIG. 7 is a partially sectional view showing a procedure of attachment of the terminal base in the screw compressor in FIG. 1.
Figure 8:
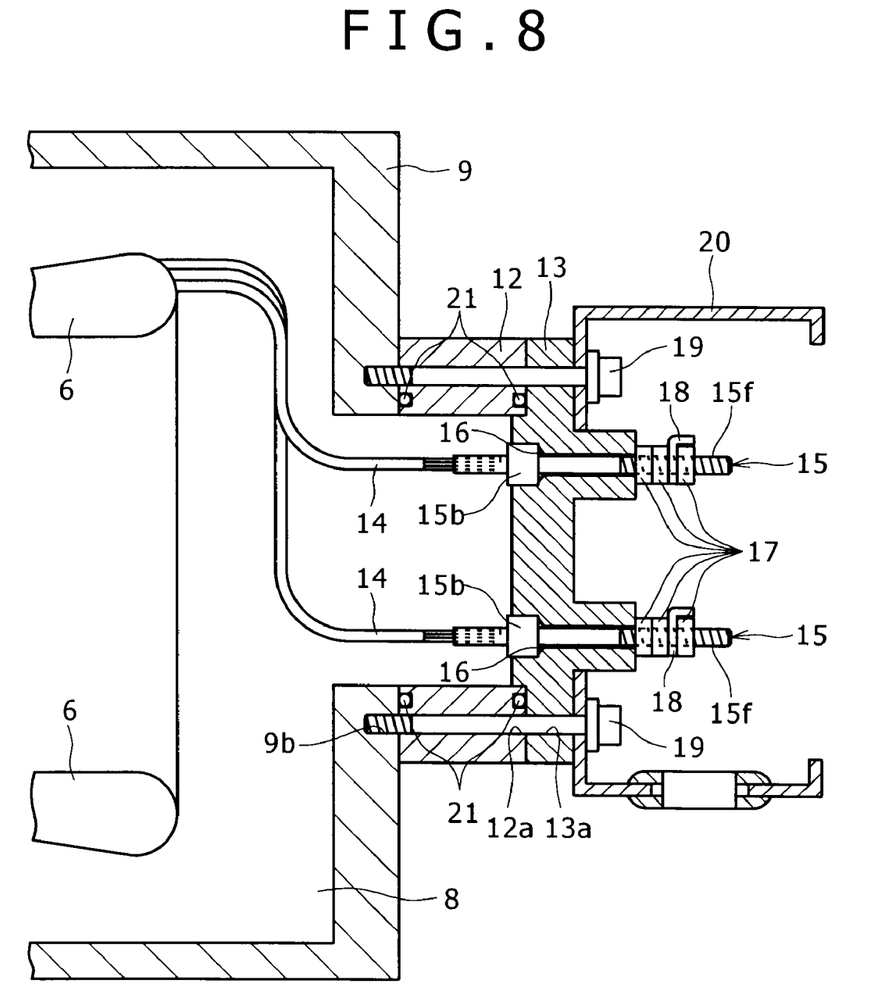
FIG. 8 is a partially sectional view showing a procedure of attachment of the terminal base in the screw compressor in FIG. 1.

As shown in FIG. 7, the spacer 12 with the O rings 21 arranged on the abutment surface with the motor casing 9 and the abutment surface with the terminal base 13 respectively, is arranged on an outer wall of a circumferential edge of the motor casing 9 surrounding the opening part 9a. As shown in FIG. 8, while the terminal rod 15 is passed from the depression 13b to the through portion 13d of the terminal base 13, the terminal base 13 is arranged on the outer side of the spacer 12. The spacer 12, the terminal base 13 and the outer box 20 are attached to the motor casing 9 by the attachment bolts 19. The flange portion 15b of the terminal rod 15 is fitted to the depression 13b, and the nuts 17a, 17b are screwed onto the thread portion 15f, so that the terminal rod 15 is fixed to the terminal base 13 by the double nut. After that, the connection terminal 18 is sandwiched and fixed between the nut 17b on the side of a front end of the thread portion 15f among the double nut and the nut 17c further screwed onto the thread portion 15f. The lid 22 is attached to the outer box 20. The seal member 16 is elastically deformed by the seal portion 13c of the terminal base 13 due to this attachment so as to block the communication between the interior and the exterior of the motor casing 9. It should be noted that after the terminal base 13 is attached to the compressor 1 in accordance with the attachment procedures above, and then in a case where the compressor 1 is in a normal operation state or a stoppage state, the pressure in the interior of the motor casing 9 is more than atmospheric pressure. Therefore, the flange portion 15b of the terminal rod 15 is pressed toward the seal portion 13c. Also by this operation, a sealing effect in the seal portion 13c is improved. The opening part 9a of the motor casing 9 is air-tightly closed by the O rings 21 arranged on the abutment surface with the motor casing 9 and the abutment surface with the terminal base 13 respectively.

In the compressor 1, the screw rotors 2, 3 are rotated by the rotational force of the motor rotor 7 so as to suction and compress the refrigerant (the ammonia gas) from the suction flow passage 11a, and discharge the compressed refrigerant from the discharge flow passage 11b.

A temperature in the motor chamber 8 is increased by the operation of the compressor 1. Thereby, a temperature in the concave part 15d of the crimping portion 15e of the terminal rod 15 fixed in the interior of the motor chamber 8 is also increased. In a case where the communication part 15h is not provided in the crimping portion 15e, the pressure of the remaining gas in the clearance part 15j in the deeper part of the concave part 15d is boosted more than the pressure in the interior of the motor chamber 8, and the force acts in the direction in which the electric wires 14 drop off the concave part 15d. However, since the communication part 15h is provided in the present embodiment, the pressure of the remaining gas is not boosted more than the pressure in the interior of the motor chamber 8 due to the temperature increase in the concave part 15d. Therefore, the force does not act in the direction in which the electric wires 14 drop off the concave part 15d, and the electric resistance between the electric wires 14 and the terminal rod 15 is not increased.

Avoid ratio in a section of the concave part 15d of the terminal rod 15 parallel to the end surface 15c is preferably not more than 20%. When a diameter of the concave part 15d at the end surface 15c of the terminal rod 15 is D, the sectional area of the concave part 15d is A1, and a sectional area of n wires each having the diameter d is A2, the void ratio is expressed by the following expressions.

$$A1 = \frac{\pi D^2}{4} \quad (1)$$

$$A2 = n \times \frac{\pi d^2}{4} \quad (2)$$

$$\text{void ratio} = \frac{A1 - A2}{A1} \quad (3)$$

The expression (4) is determined based on the expressions (1), (2) and (3).

$$\text{void ratio} = \frac{D^2 - nd^2}{D^2} \quad (4)$$

For example, in a case where sixteen aluminum wires of φ 1.2 mm are used as the electric wires 14 and the void ratio is set to be not more than 20%, "d=1.2" and "n=16" are substituted into the expression (4).

$$\text{void ratio} = \frac{D^2 - 16 \times 1.2^2}{D^2} \leq 0.2 \quad (5)$$

According to the expression (5), D≦5.36. Therefore, in a case where the sixteen aluminum wires 14 of φ 1.2 mm are used as the electric wires 14, the diameter of the concave part 15d at the end surface 15c of the terminal rod 15 is set to be not more than 5.36 mm, so that the void ratio can be not more than 20%. When the void ratio between the aluminum wires 14 and the section parallel to the end surface 15c of the terminal rod 15 before crimping is not more than 20%, at the time of pressurizing the crimping portion 15e, it is possible to reduce deformation of the terminal rod 15 and prevent generation of troubles such as cracking in the crimping portion 15e. That is, it is possible to avoid a problem that at the time of pressurizing the crimping portion 15e with a high void ratio, the deformation of the terminal rod 15 is increased and predetermined strength is not ensured.

In the embodiment above, the screw compressor 1 is described as an example. However, a compressor other than the screw compressor 1 may be used. The terminal base 13 may be attached to not an end but a side part of the motor casing 9 via the spacer 12. In a case where the interior of the motor casing 9 includes a large space in which the electric wires 14 are easily arranged, the spacer 12 is not necessarily provided but the motor casing 9 and the terminal base 13 may be directly combined. It should be noted that the rotor casing 5 and the motor casing 9 of the present invention are not classified based on structural integrity, but it should be understood that a part forming the rotor chamber 4 is the rotor casing 5 and a part forming the motor chamber 8 is the motor casing 9.

The seal portion according to the present invention may have a mode other than the seal portion 13c of the embodiment above. For example, FIGS. 9A and 9B are partially sectional views showing seal portions other than the seal portion 13c of the embodiment above in the screw compressor according to the present invention.

Figure 9A:
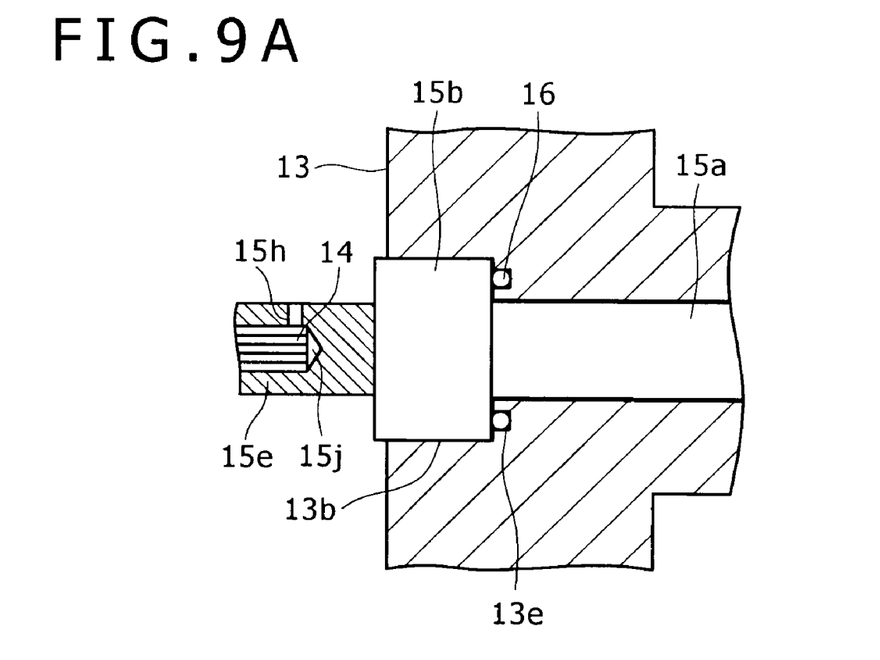
FIGS. 9A and 9B are partially sectional views showing other seal portions in the screw compressor according to the present invention.

In FIG. 9A, an annular concave part is provided on a surface of the terminal base 13 facing a surface of the flange portion 15b on the opposite side of the crimping portion 15e, and the seal member 16 is fitted into (disposed along) the annular concave part, so that a seal portion 13e is formed.

Figure 9B:
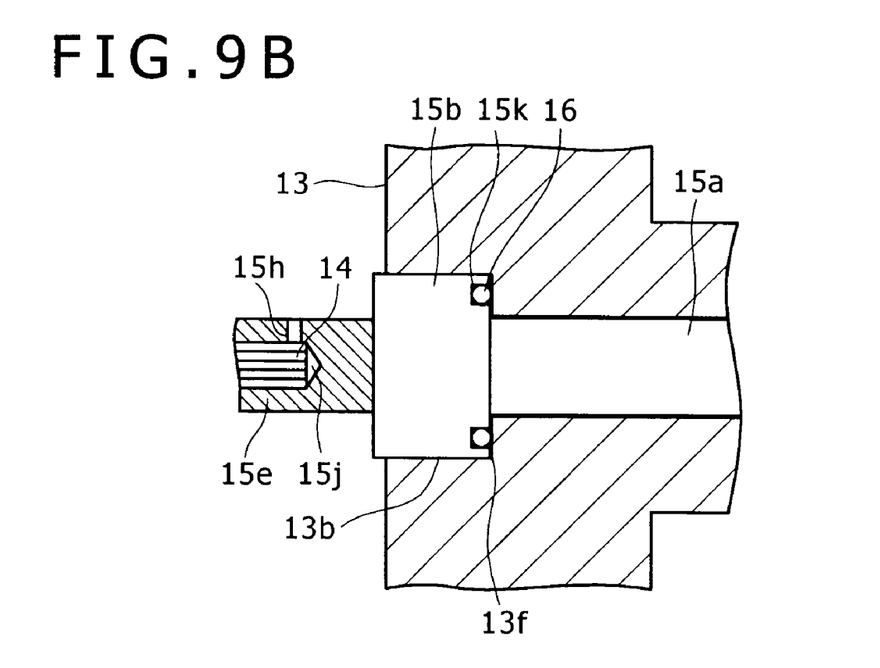

In FIG. 9B, the surface of the terminal base 13 facing the surface of the flange portion 15b on the opposite side of the crimping portion 15e is a flat and smooth surface, and a seal portion 13f is formed. It should be noted that an annular concave part 15k is provided on the surface of the flange portion 15b on the opposite side of the crimping portion 15e, and the seal member 16 is fitted into the annular concave part 15k.

With the seal portions of FIGS. 9A and 9B, a sealing effect which is equal to or more than the effect of the seal portion 13c of the embodiment above will be obtained. However, the seal portion 13c of the embodiment above is superior to the seal portions shown in FIGS. 9A and 9B in that the seal portion is more easily processed and the seal member is more easily disposed along the seal portion.

What is claimed is:

1. A motor, comprising:
a motor casing;
a terminal rod having a flange portion arranged between both ends thereof, and a crimping portion arranged in one end thereof, with a concave part formed on an end surface of said crimping portion, and a communication part providing communication between an outer surface of said crimping portion and said concave part;
a terminal base having a depression provided on a surface thereof contacted with the interior of said motor casing, a seal portion adjacent to said depression, and a through portion passing from said seal portion through to the exterior of said motor casing, said terminal base fitted to said flange portion of said terminal rod at said depression;
a seal member disposed along said seal portion; and
a plurality of electric wires with one ends connected to a motor stator inside said motor casing, and the other ends fixed to said crimping portion by pressurizing the outer surface of said crimping portion in a state that the other ends are inserted into said concave part, wherein
said terminal base is attached to said motor casing, and
said terminal rod passes through said terminal base with the other end on the opposite side of said crimping portion exposed to the exterior of said motor casing.

2. The motor according to claim 1, wherein
said seal portion has a diameter gradually reduced in the direction from said depression toward the exterior of said motor casing, and
said seal member is put on said terminal rod on the opposite side of said flange portion with respect to said crimping portion so as to be disposed along said seal portion.

3. The motor according to claim 1, wherein
said terminal base is made of polyphenylene sulfide.

4. The motor according to claim 1, wherein
both of a plurality of said electric wires and said terminal rod contain aluminum.

5. The motor according to claim 1, wherein
each of a plurality of said electric wires is provided with a coat made of fluorine resin.

6. A compressor with the motor according to claim 1.

* * * * *